United States Patent [19]

Hayashi et al.

[11] Patent Number: 5,033,789
[45] Date of Patent: Jul. 23, 1991

[54] CONVERTIBLE CAR BODY STRUCTURE

[75] Inventors: Masayuki Hayashi, Toyohashi; Hideki Nakashima, Toyota; Hiroshi Ootsuka, Yokohama, all of Japan

[73] Assignees: Aisin Seiki Kabushiki Kaisha; Kanto Jidosha Kogyo Kabushiki Kaisha, both of Japan

[21] Appl. No.: 501,255

[22] Filed: Mar. 29, 1990

[30] Foreign Application Priority Data

Mar. 31, 1989 [JP] Japan ................. 1-38250[U]
Mar. 31, 1989 [JP] Japan ................. 1-38251[U]
Mar. 31, 1989 [JP] Japan ................. 1-38252[U]

[51] Int. Cl.$^5$ ............................................. B60J 7/02
[52] U.S. Cl. .................................. 296/216; 296/219; 296/223
[58] Field of Search ............. 296/216, 108, 107, 219, 296/223

[56] References Cited

U.S. PATENT DOCUMENTS 4,600,233 7/1986 Boydston ........................... 296/136
4,854,634 9/1989 Shiraishi et al. ................... 296/108
4,895,409 1/1990 Konishi et al. ..................... 296/216

FOREIGN PATENT DOCUMENTS

8202365 7/1982 Fed. Rep. of Germany .

Primary Examiner—Robert R. Song
Attorney, Agent, or Firm—Finnegan, Henderson, Farabow, Garrett & Dunner

[57] ABSTRACT

A convertible car body structure which includes a pair of side structures, a front windshield structure and a rear structure, the body structure having a top opening and a back window opening. A roof panel and a back window panel are provided for covering the top opening and the back window opening of the car body structure, respectively. The roof panel is connected at the rear end portion swingably with the front end portion of the back window panel so that the roof panel can be folded on the back window panel. The back window panel is connected at the rear end portion swingably with the rear body structure. The rear body structure is formed with a concave space for receiving the roof panel and the back window panel after the roof panel has been folded on the back window panel. A concealing cover panel is provided on the rear body structure for covering the concave space. The cover panel is swingably connected at a rear end portion with the rear body structure adjacent to a rear end portion of the concave space in the rear body structure. A locking mechanism is provided for retaining the concave cover panel on the rear structure so that fluttering of the cover panel is prevented. The locking mechanism includes a striker provided on the cover panel, a latch member provided on the rear structure for engagement with the striker and a driving mechanism for the latch member.

11 Claims, 8 Drawing Sheets

CONVERTIBLE CAR BODY STRUCTURE

BACKGROUND OF THE INVENTION

1. Field of the Invention

The present invention relates to a roof structure of a convertible type car structure. More specifically, the present invention pertains to a locking device for a retractable roof structure of a convertible type car.

2. Description of the Prior Art

In a convertible type car body structure, a retractable roof structure is known. In this type, the roof panel is swingably connected at the rear end with the top edge portion of the back window panel through a hinge structure. The back window panel is swingably connected with the rear structure of the car body. The roof panel and the rear window panel can be swingably moved so that they are folded and retracted into the rear body structure. The roof and rear window panels thus retracted into the rear body structure are then covered by a concealing cover panel.

In this type of retractable roof structure, problems have been experienced in that the roof panels and the back window panel produce fluttering in operation. Similar fluttering is also produced in the concealing cover panel.

SUMMARY OF THE INVENTION

It is therefore an object of the present invention to provide a retractable roof structure for a convertible car body in which the aforementioned fluttering can effectively be prevented.

Another object of the present invention is to provide locking mechanisms for the retractable roof structure and the concealing cover panel which is effective to prevent the aforementioned fluttering.

According to one aspect of the present invention, the above and other objects can be accomplished by a concealing cover panel provided with striker means which is adapted to cooperate with latch means provided on the car body structure. The latch means is connected with driving means which may include motor means and a gear mechanism. The driving means is operated to bring the latch means into engagement with the striker means so that the concealing cover panel is firmly held on the car body to thereby prevent the possibility of fluttering.

According to another aspect of the present invention, locking means is provided between the roof panel and the car body. The locking means comprises catch means provided on the roof panel and manually actuatable hook means provided on the car body. The hook means is provided with handle means and adapted to be manually actuated into engagement with the catch means on the roof panel. The hook means may be provided on the side structure of the car body. By providing the locking means as described, it is possible to firmly retain the roof panel on the car body so that the fluttering can be prevented.

According to a further aspect of the present invention, locking means is provided between the back window panel and the car body. The locking means comprises base means provided on the car body and catch means provided on the back window panel. The catch on the back window panel is provided with manually actuatable handle means which is adapted to be actuated to bring the catch means into engagement with the base means. With this locking means, the back window panel can be firmly retained so that the fluttering can be effectively prevented.

The above and other objects and features of the present invention will become apparent from the following description of a preferred embodiment taking reference to the accompanying drawings.

BRIEF DESCRIPTION OF THE DRAWINGS

FIG. 4A is a side view of the catch used in the locking mechanism shown in FIG. 2;

DESCRIPTION OF THE PREFERRED EMBODIMENT

Figure 1:
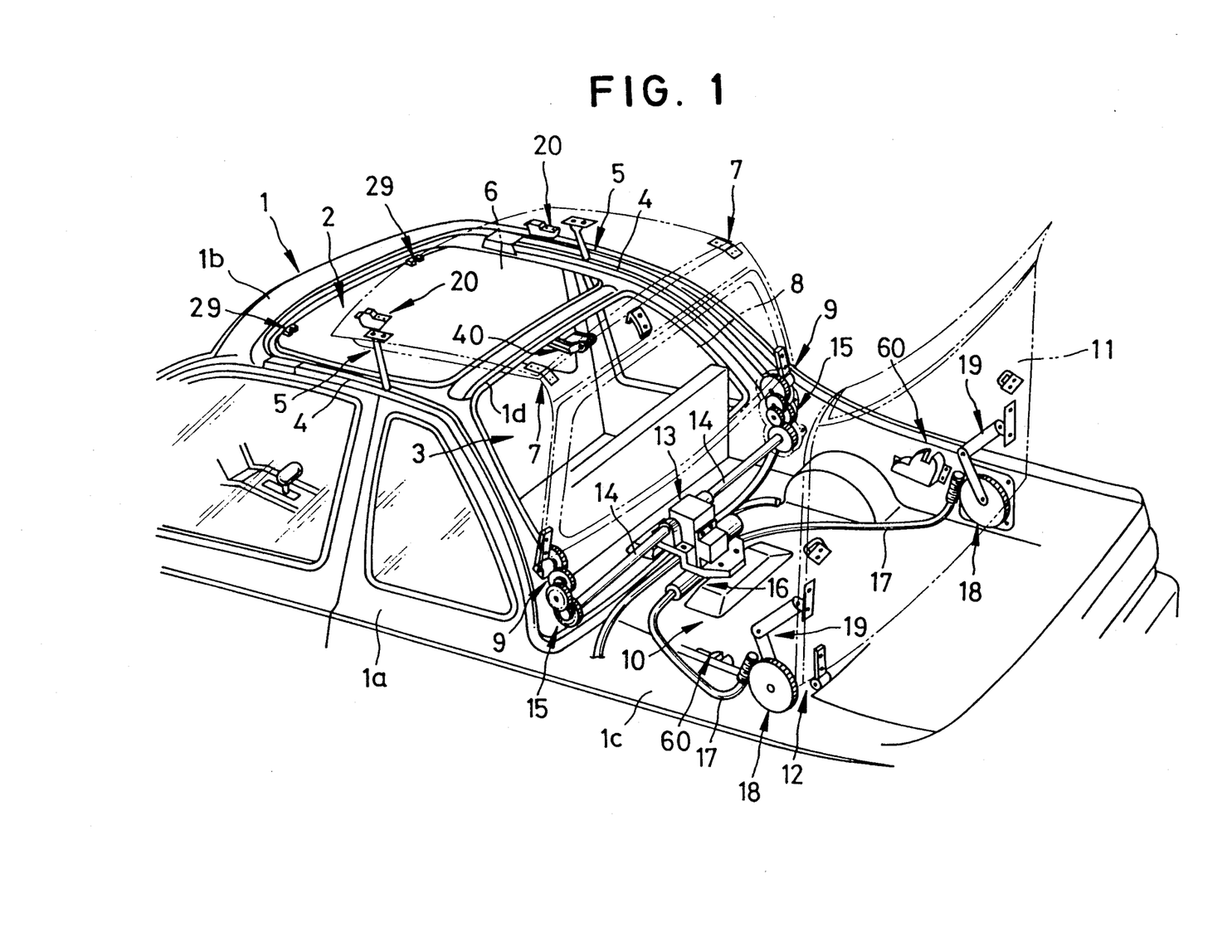
FIG. 1 is a perspective view of a car roof structure in accordance with one embodiment of the present invention.

Referring to the drawings, particularly to FIG. 1, there is shown a car body 1 which has a pair of side structures 1a, a front windshield structure 1b and a rear body structure 1c. The car body 1 is formed at the top portion with a roof opening 2 and at the rear upper portion with a back window opening 3. The side structures 1a are provided along side edge portions of the roof opening 2 and the back window opening 3 with guide rails 4.

The car body includes a roof structure comprising a roof panel 6 for closing the roof opening 2. The roof panel 6 is provided at the opposite sides of a front end portion with links 5 through which the roof panel 6 is engaged with the rails 4 on the side structures 1a. There is provided a back window panel 8 for closing the back window opening 3. The roof panel 6 is connected at a rear end portion with an upper end portion of the back window panel 8 through hinges 7 so that the roof panel 6 is swingable with respect to the back window panel 8. The back window panel 8 is connected at a lower end portion with the rear body structure 1c in the vicinity of the lower end portion of the back window opening 3 through hinges 9.

The rear body structure 1c formed with a concave space 10 for receiving the roof panel 6 and the back window panel 8. The roof panel 6 is connected with the back window panel 8 for swingable movement as previously described. The back window opening 8 is swingable toward rearwards with respect to the car body structure due to the aforementioned hinge connection. Thus, the roof panel 6 can be folded on the back window panel 8 by swingably moving the back window panel 8 rearwards. The roof panel 6 and the back window panel 8 can thus be retracted into the concave space 10 in the rear body structure.

There is provided a panel driving mechanism 13 which is located in the rear body structure 1c beneath the lower end portion of the back window opening 3. The driving mechanism 13 includes a motor having an output shaft connected with driving shafts 14. The driving shafts 14 are connected through reduction gear mechanisms 15 with hinge pins in the hinge mechanisms 9. The hinge pins of the hinge mechanisms 9 are secured to hinge members which are attached to the back window panel 8. It will therefore be understood that an operation of the driving mechanism 13 will cause a swingable movement of the back window panel 8 into and out of the concave space 10 in the rear body structure 1c. Although not shown in the drawing, cables are arranged along the guide rails 4 and connected on one hand with the links 5 and on the other hand with the driving mechanism 13. Thus, the operation of the driving mechanism 13 will also cause movement of the front end portion of the roof panel 6 into and out of the concave space 10. Thus, the roof panel 6 and the back window panel 8 can be moved between an extended or closed position and a retracted position, the extended position being a position wherein the roof panel 6 covers the roof opening 2 and the back window panel 8 covers the back window opening 3, the retracted position being a position wherein the panels 6 and 8 are completely retracted into the concave space 10. The rear body structure 1c is further provided with concealing cover panel 11 for covering the concave space. The cover panel 11 is connected with the rear body structure 1c at the rear end portion of the concave space 10 through hinges 12. A cover driving mechanism 16 is provided in the rear body structure 1c for driving the concealing cover 11 between a closed position in which the cover 11 closes the concave space 10 and an open position in which the cover 11 opens the space 10. The cover driving mechanism 16 drives the cover 11 through cables 17, reduction gear mechanisms 18 and linkages 19 to place the panel 11 in the closed position both in the extended and retracted positions of the panels 6 and 8 and to open the panel 11 when the panels 6 and 8 are being moved.

The roof panel 6 is provided at the opposite sides of the front end portion with roof panel locking mechanisms 20 for firmly retaining the roof panel 6 on the car body 1. On an intermediate portion of the front upper end portion of the back window panel 8, there is provided back window locking mechanism 40 for firmly retaining the back window panel 8 on the transverse beam 1d of the car body structure 1. The rear body structure 1c is provided at the opposite sides of the concave space 10 with concealing cover panel locking mechanisms 60 for firmly retaining the side edge portions of the concealing cover panel 11 on the rear body structure 1c. The locking mechanisms 20 and 40 function to prevent fluttering of the panels 6 and 8 when the panels are in the closed or extended positions. The locking mechanism 60 functions to prevent fluttering of the concealing cover panel 11 both in the extended and retracted positions of the panels 6 and 8.

Figure 2:
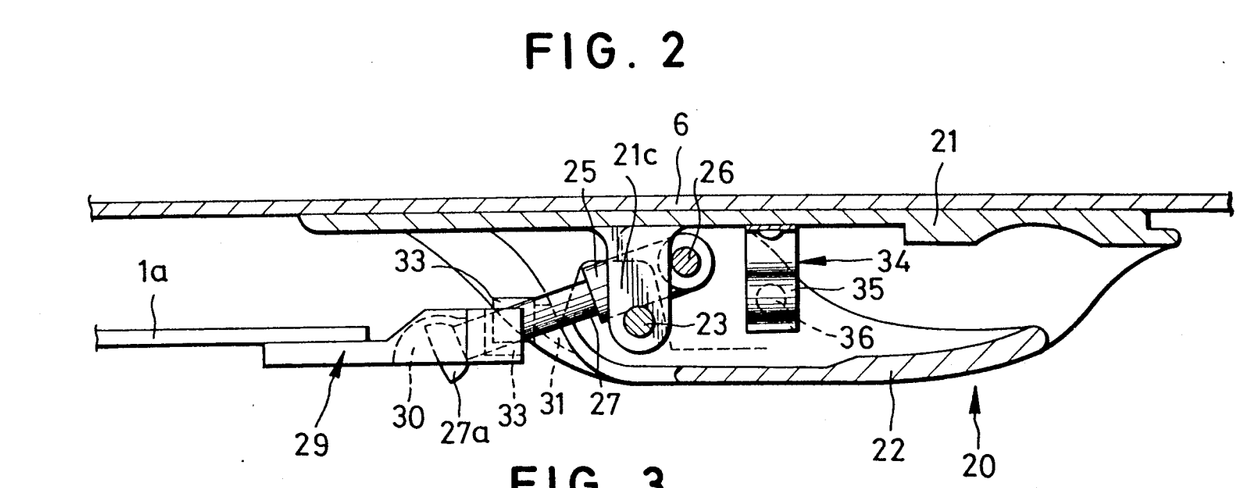
FIG. 2 is a side view showing the roof panel locking mechanism.
Figure 3:
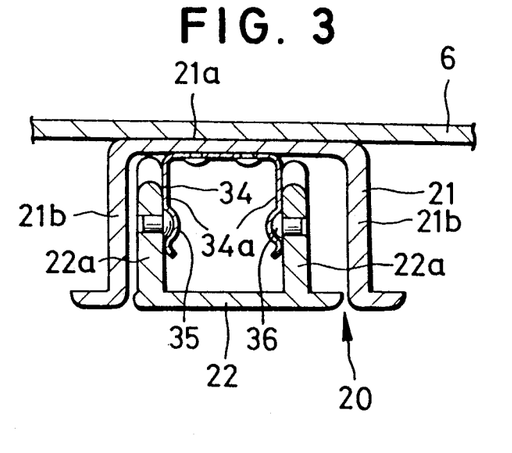
FIG. 3 is a sectional view of the locking mechanism shown in FIG. 2.
Figure 4:
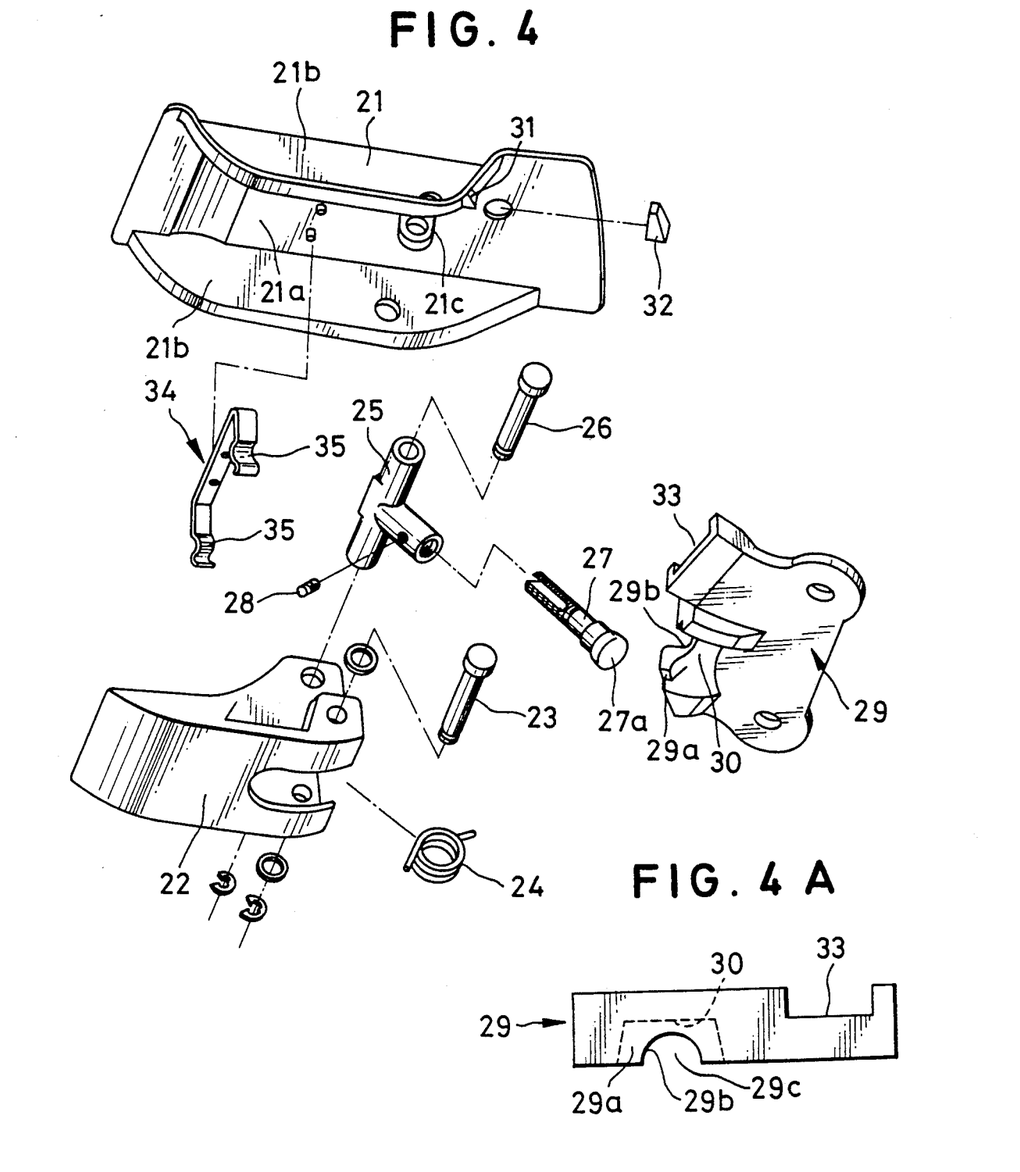
FIG. 4 is an exploded perspective view of the locking mechanism shown in FIG. 2.

Referring now to FIGS. 2 through 4, each of the roof panel locking mechanism 20, provided at each side of the front end portion of the roof panel 6, includes a case 21 which is of an inverted channel-shaped cross-sectional shape having a bottom 21a and a pair of side walls 21b. A lug 21c is formed on the bottom 21a to extend in parallel with the side walls 21b. As shown in FIGS. 2 and 4, a handle 22 is carried by the case 21. The handle 22 is swingably supported by the side walls 21b and the lug 21c through 1 pin 23. A T-shaped member 25 is carried by the handle 22 by means of a pin 26 which is parallel with but offset from the pin 23 for mounting the handle 22 on the case 21. The T-shaped member 25 has a hook member 27 which is secured thereto by means of a retaining screw 28. The hook member 27 has a tip end formed with semi-spherical hook portion 27a.

The front windshield structure 1b is provided with a catch 29 for cooperation with the locking mechanism 20, specifically with the hook member 27 carried by the handle 22 of each locking mechanism 20. The catch 29 has a ridge 29a which is formed with a cutout 29b. A relief groove 30 is formed behind the ridge 29a. Referring to FIG. 2, in which the locking mechanism is shown in a locked condition, it will be noted that a counter-clockwise swinging movement of the handle 22 about the pin 23, from the position shown, will cause movement of the pin 26 which supports the T-shaped member 25 through an arcuate path about the pin 23, so that the hook member 27 and the hook portion 27a on the T-shaped member 25 will ultimately be moved left. At the end of such arcuate path the T-shaped member 25 is moved so that the hook portion 27a of the hook member 27 is disengaged from the ridge 29a of the catch 29 to release the latch 20. Thus in unlocking the latch 20, the handle 22 is swingably moved counter-clockwise to move the pin 26 and the T-shaped member to the left. Then, the engagement between the hook member 27 and the catch 29 is loosened so that the hook member can be removed from the catch 29. To lock the latch 20, the hook portion 27a of the T-shaped member 27 is received in the relief groove 30 of the catch 29 and the shaft portion of the hook member 27 passes through the cutout 29c in the ridge 29a. Then, the handle 22 is swingably moved clockwise to the position shown in FIG. 2 to move the pin 26 back through the aforementioned arcuate path and ultimately to the toward right in the plane of FIG. 2. Thus, the roof panel 6 is pulled toward the front windshield structure 1b to be securely retained thereon.

The case 21 is formed with a projection 31 on which a rubber stopper 32 is mounted. The catch 29 is formed with a groove 33 which is adapted to be engaged with the rubber stopper 32 on the case 21 in the locking position of the mechanism. Thus, the roof panel 6 is retained in a predetermined position with respect to the side body structure 1a. As shown in FIGS. 2 and 3, a retaining member 34 of an inverted channel-shaped cross-sectional configuration is attached to the bottom 21a of the case 21. The handle 22 is of a channel-shaped cross-sectional configuration and has a pair of side walls 22a as shown in FIG. 3. The retaining member 34 has a pair of leg portions 34a which extend along the side walls 22a of the handle 22. The leg portions 34a of the retaining member 34 are formed with recesses 35. The side walls 22a of the handle 22 are provided with projections 36 which are adapted to be engaged with the recesses 35 in the leg portions 34a of the retaining member 34 when the handle 22 is in the position shown in FIG. 2. Thus, the handle 22 is firmly retained in the case 21.

Figure 5:
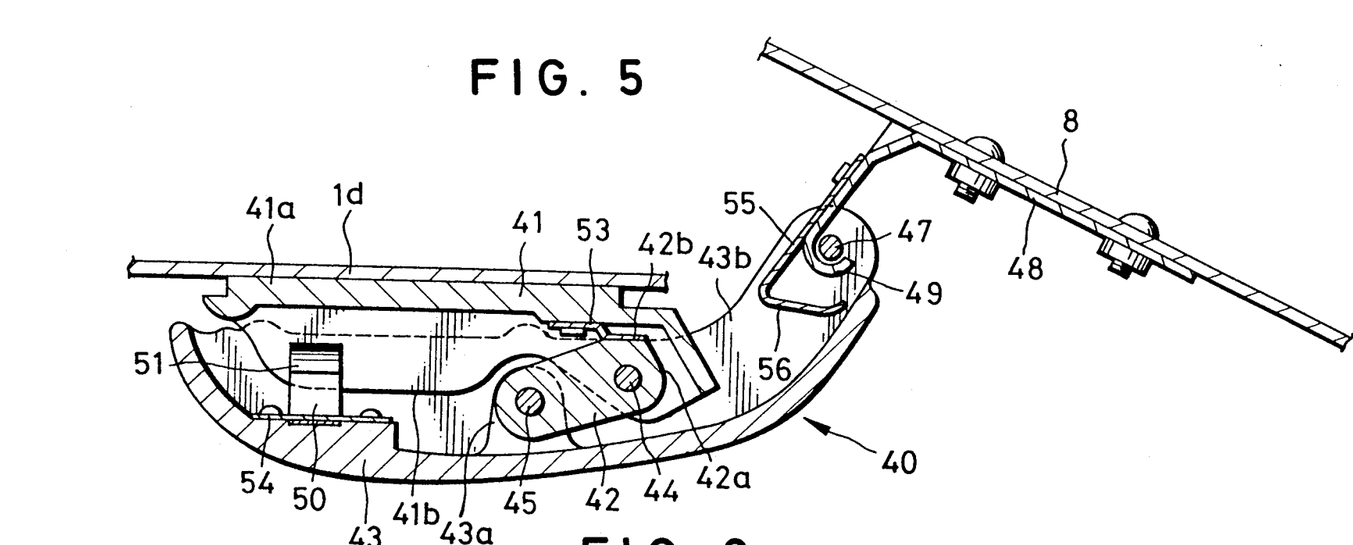
FIG. 5 is a side view showing the back window panel locking mechanism.
Figure 6:
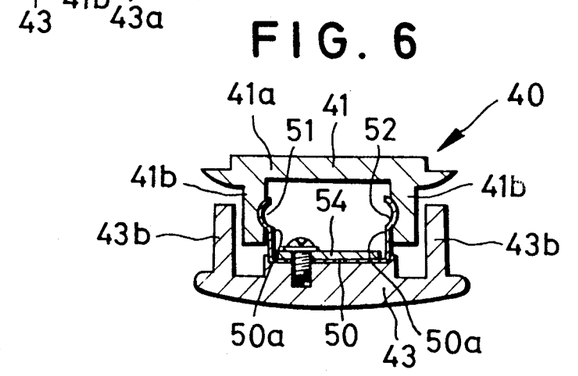
FIG. 6 is a sectional view of the locking mechanism shown in FIG. 5.
Figure 7:
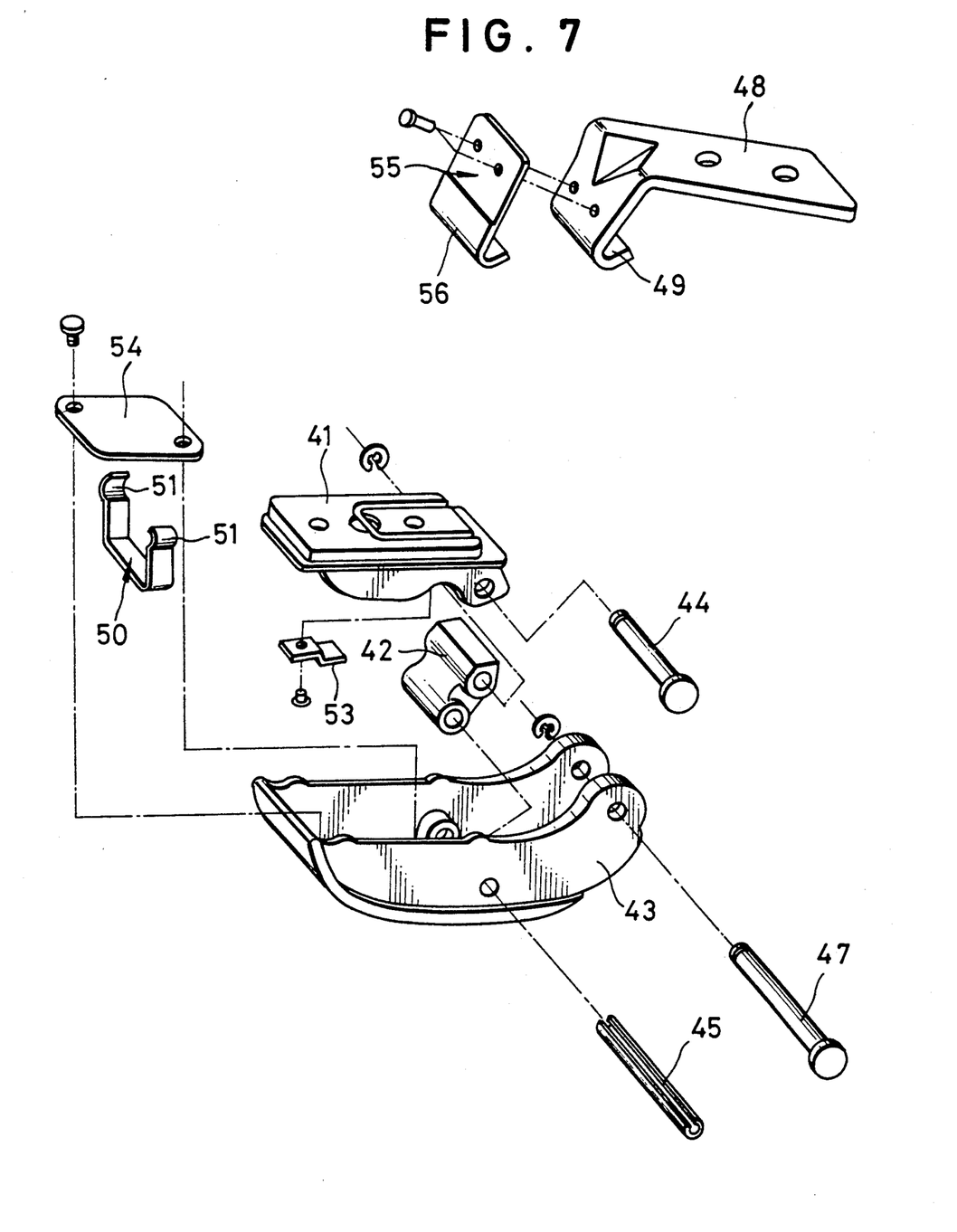
FIG. 7 is an exploded perspective view of the locking mechanism shown in FIG. 5.

Referring now to FIGS. 5 through 7, there are shown details of the back window panel locking mechanism 40. The mechanism 40 includes a base 41 mounted on the transverse beam 1d. The base 41 is of an inverted channel-shaped cross-sectional configuration having a bottom 41a and a pair of side walls 41b. A link 42 is pivotably connected at one end to the side walls 41b of the base 41 by means of a pin 44. A handle 43 is provided and has lugs 43a. The other end of the link 42 is pivotably connected with the lugs 43a of the handle 43 by means of a pin 45.

As shown in FIG. 6, the handle 43 is of a channel-shaped cross-sectional configuration and has a pair of side walls 43b. At a rearward end portion of the handle 43, there is a pin 47 which extends between the side walls 43b. The back window panel 8 has a catch 48 which is secured thereto and formed at a free end with a hook 49 for engagement with the pin 47 on the handle 43. A plate 55 is attached to the hook 49 and has a guide portion 56. The guide portion 56 serves to hit the pin 47 on the handle 43 when the back window panel 8 is being moved toward the closed position to thereby guide the pin 47 toward the hook 49.

At a front end portion of the handle 43, there is provided a retaining member 50 of a channel-shaped cross-sectional configuration having a pair of legs 50a. The retaining member 50 is made of a resilient material and secured to the handle 43 through a retaining plate 54 and a screw. The legs 50a of the retaining member 50 are formed with sideward projections 51. The side walls 41b of the base 41 are formed with recesses 52 which are adapted for engagement with the projections 51 on the retaining member 50. Through this engagement between the projections 51 on the retaining member 50 and the recesses 52 in the side walls 41b of the base 41, the handle 43 can be retained in the position shown in FIG. 5. The base 41 is further provided with a click retaining spring 53 which is adapted for engagement alternately with flattened edges 42a and 42b. In the position shown in FIG. 5, the spring 53 engages the flattened edge 42b but when the handle 43 is swingably moved counter-clockwise in the plane of FIG. 5 the flattened edge 42a engages the spring 53.

FIG. 5 shows the handle 43 in the locking position. For unlocking, the handle 43 is swingably moved counterclockwise by holding the left hand end portion of the handle 43. The handle 43 is then swung about the pin 47 simultaneously producing a counter-clockwise swinging movement of the link 42. The engagement between the pin 47 and the hook 49 is then loosened so that the pin can be removed from the hook 49. For locking, the pin 47 is first engaged with the hook 49 and the handle 43 is swingably moved clockwise. This movement of the handle 43 causes a counterclockwise swinging movement of the link 42 so that the link 42 is moved to the position shown in FIG. 5. The position of the pin 45 is then moved leftwards so that the back window panel 8 is pulled toward the transverse beam 1d. The back window panel 8 is thus firmly retained on the car body structure 1.

Figure 8:
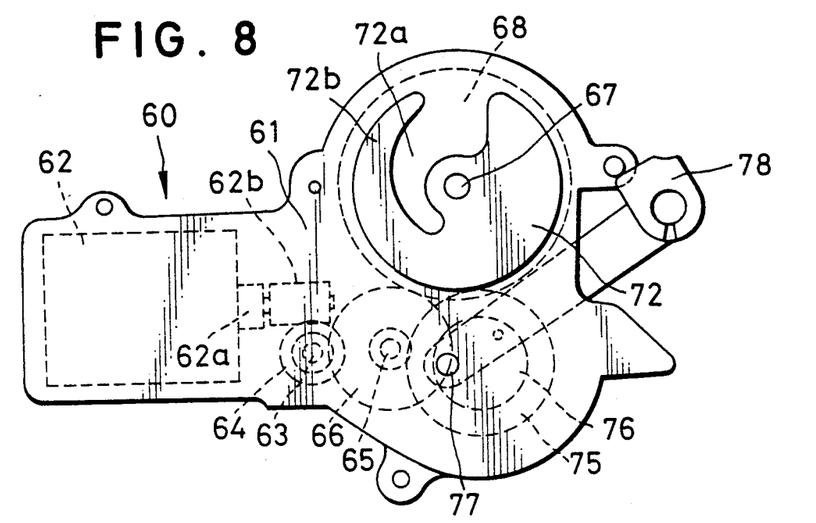
FIG. 8 is a side view of the concealing cover panel locking mechanism.
Figure 9:
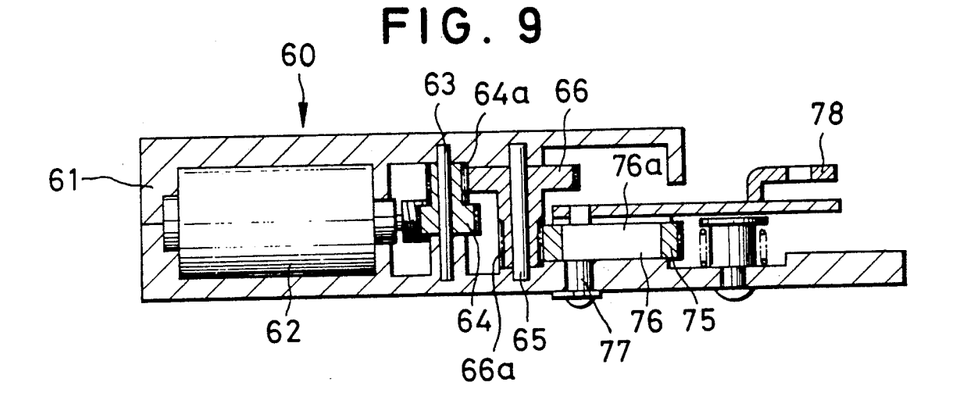
FIG. 9 is a cross-sectional view of the locking mechanism shown in FIG. 8.
Figure 10:
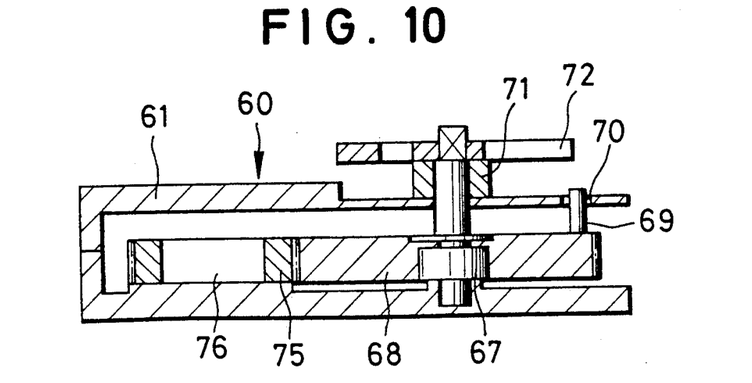
FIG. 10 is a longitudinal sectional view of the locking mechanism shown in FIG. 8.
Figure 11:
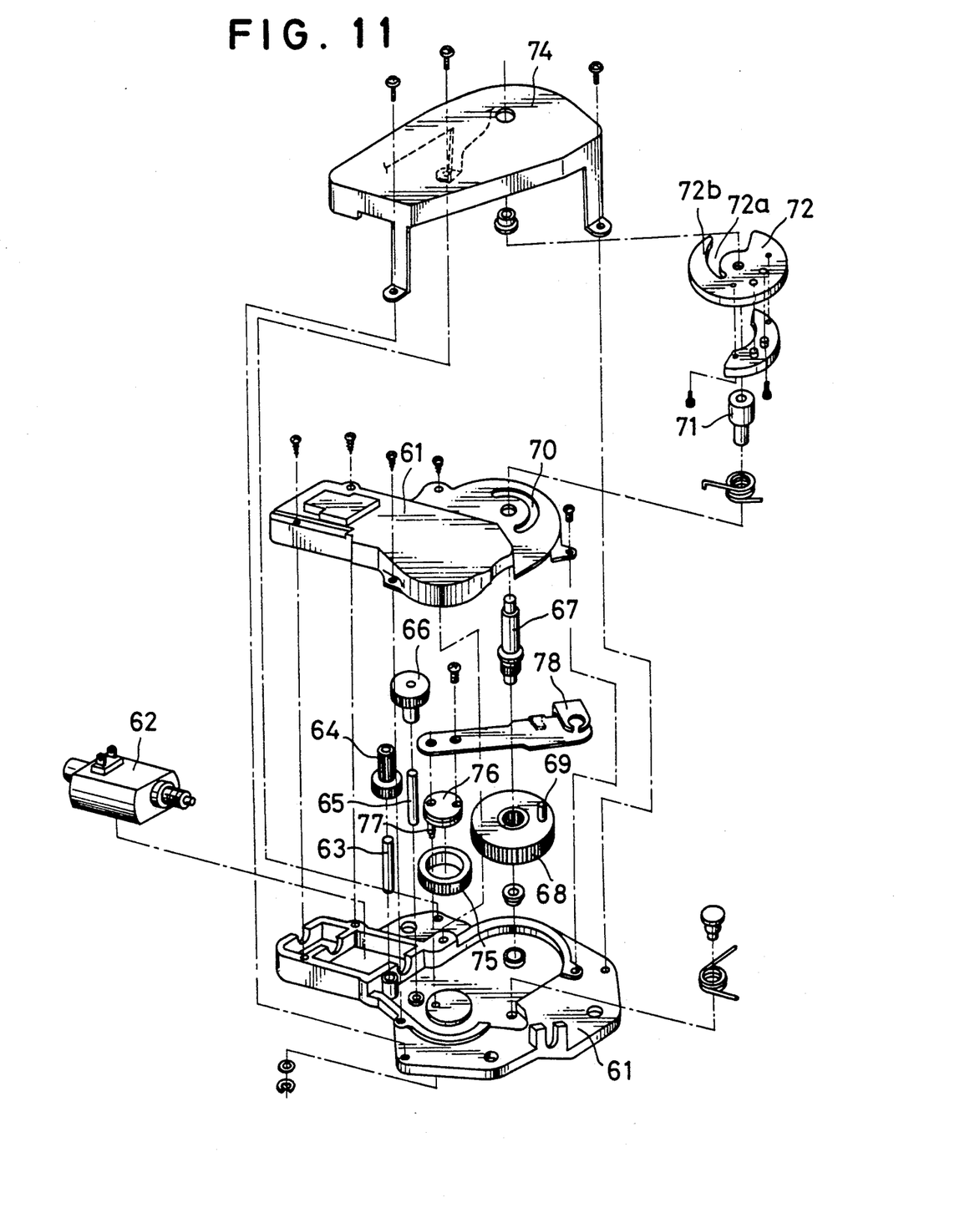
FIG. 11 is an exploded perspective view of the locking mechanism shown in FIG. 8.
Figure 12:
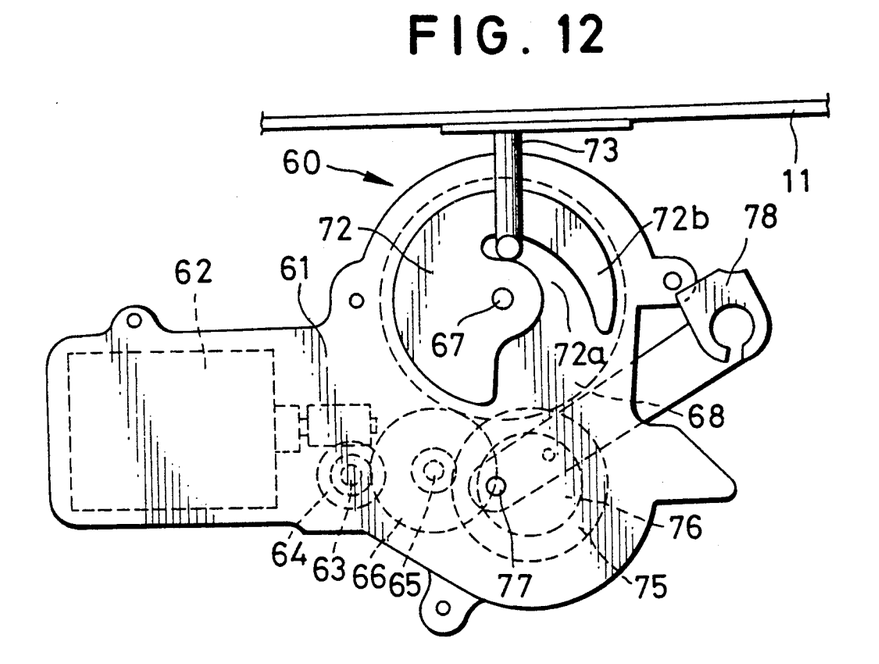
FIG. 12 is a plan view showing the locking mechanism of FIG. 8 in the locking position; and, FIG. 13 is a plan view similar to FIG. 12 but showing the lock release position.
Figure 13:
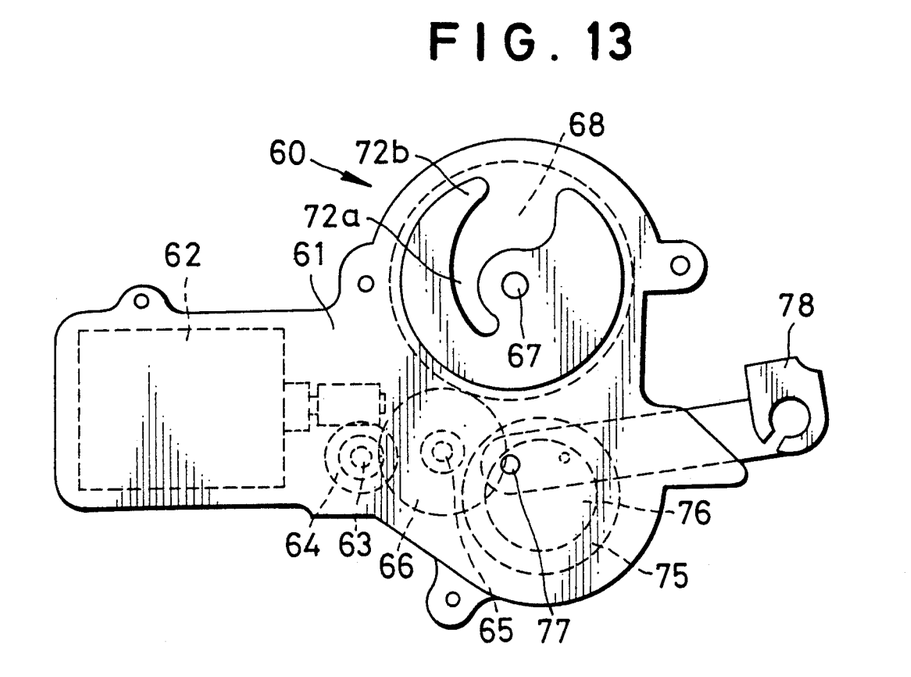

Referring to FIGS. 8 through 13 showing the concealing cover panel locking mechanism 60, it will be noted that the mechanism 60 includes a case 61 which is mounted on a side wall (not shown) of the rear body structure 1c defining the concave space 10. In the case, there is a motor 62 having an output shaft 62a connected with a worm gear 62b. A first gear 64 is mounted on the case 61 through a pin 63 which extends perpendicularly to the axis of the output shaft 62a of the motor 62 for rotation about the axis of the pin 63. The gear 64 has a small gear 64a which is in meshing engagement with a second gear 66 which is mounted on the case 61 by means of a pin 65 extending in parallel with the pin 63. The second gear 66 has a small gear 66a which is in meshing engagement with an idler gear 75. The idler gear 75 is engaged with a latch gear 68 mounted on the case 61 through a shaft 67. The shaft 67 is secured to the gear 68 so that they rotate together. As shown in FIGS. 10 and 11, the gear 68 is provided with a pin 69 which is inserted into an arcuate slot 70 formed in the case 61 to thereby limit the extent of rotation of the latch gear 68.

The shaft 67 has one end extending through the case 61 and a latch member 72 is mounted on the end of the shaft 67. A spacer 71 is disposed between the case 61 and the latch member 72. As shown in FIGS. 8 and 11, the latch member 72 is formed with an arcuate slot 72a and a finger 72b. A striker 73 is mounted on the concealing cover panel 11 and adapted for engagement with the latch member 72. The case 61 is provided with a cover 74 for covering the parts mounted on the case 61.

For locking, the concealing cover panel 11 is brought into the closed position wherein the striker 73 is located in the slot 72a of the latch member 72. The motor 62 is then energized to drive the latch gear 68 clockwise as seen in the plane of FIG. 8. The latch is therefore driven until the finger 72b is engaged with the striker 73 An operation of the motor 62 in the opposite direction will unlock the mechanism 60.

The idler gear 75 is mounted on the case 61 through an eccentric shaft 76. As shown in FIG. 9, the eccentric shaft 76 has a pin portion 77 which in mounted on the case 61 and an eccentric portion 76a which carries the idler gear 75. An actuating lever 78 is attached to the pin portion 77 and extends outside the case 61. In the position shown in FIG. 8, the idler gear 75 is engaged with the small gear on the second gear 66 and the latch gear 68. When the lever 78 is moved clockwise in the plane of FIG. 8, the idler gear 75 is moved about the axis of the pin portion 77 away from the latch gear 68. Thus, the idler gear 75 is disengaged from the latch gear 68. In this position, the latch member 72 can be rotated manually.

In the structures described above, when it is desired to move the roof structure from the extended position to the retracted position, the roof panel locking mechanism 20 and the back window locking mechanism 40 are at first manually unlocked. Then, the motor 62 for the concealing cover panel locking mechanism 60 is operated to unlock the locking mechanism 60. The concealing cover panel driving mechanism 16 is then operated to drive the linkage 19 to move the cover panel 11 to the open position. Thereafter, the driving mechanism 13 is operated to thereby drive the link mechanisms 5 and the hinge mechanisms 9. The roof panel 6 is therefore folded on the back window panel 8 and the panels 6 and 8 are retracted into the concave space 10. Thus, the openings 2 and 3 are exposed. The concealing cover panel 11 is then moved to the closed position through an operation of the cover driving mechanism 16. Thereafter, the motor 62 for the concealing cover locking mechanism 60 is operated to move the locking mechanism 60 into the locking position. The panels 6 and 8 can be brought into the closed positions by reverting the operations described above.

The invention have thus been described with reference to a specific embodiment, however, it should be noted that the invention is in no way limited to the details of the illustrated structures but changes and modifications may be made without departing from the scope of the appended claims.

We claim

1. A convertible car body structure including a pair of side structures, a front windshield structure and a rear structure, said body structure having a top opening and a back window opening, a roof panel for covering said top opening of the car body structure, a back window panel for covering said back window opening of the car body structure, said roof panel having a rear end portion swingably connected with a front end portion of said back window panel so that said roof panel can be folded on said back window panel, said back window panel having a rear end portion swingably connected with said rear structure, said rear structure being formed with a concave space for receiving said roof panel and said back window panel after said roof panel has been folded on said back window panel, a concealing cover panel provided on said rear structure for covering said concave space, said cover panel being swingably connected at a rear end portion with said rear structure adjacent to a rear end portion of said concave space in said rear structure, locking means for retaining said concave cover panel on said rear structure, said locking means including a striker provided on said cover panel, a latch member provided on said rear structure for engagement with said striker, driving means for said latch member including motor means and gear means for transmitting rotation of said motor means to said latch member.

2. A car body structure in accordance with claim 1 in which said gear means includes a latch gear connected with said latch member for rotation with said latch member, a driven gear adapted to be driven by said motor means, an idler gear between said driven gear and said latch gear for transmitting a rotation from said driven gear to said latch gear, and means for manually moving said idler gear into and out of engagement with at least one of said latch gear.

3. A car body structure in accordance with claim 2 in which said manually moving means includes eccentric shaft means carrying said idler gear.

4. A car body structure in accordance with claim 1 which further includes roof panel locking means for retaining said roof panel on said body structure in a position wherein said roof panel closes said top opening, said roof panel locking means including a catch mounted on said body structure, manually actuatable handle mounted on said roof panel for swinging movement, said handle has hook means mounted on said handle for a swinging movement about an axis offset from an axis of the swinging movement of said handle and adapted for engagement with said catch, means provided on said roof panel for holding said handle in a locking position.

5. A car body structure in accordance with claim 4 in which said catch is formed with a ridge and a relief groove behind said ridge and said hook means has spherical end portion for engagement with said ridge of said catch.

6. A car body structure in accordance with claim 4 in which said catch is formed with a ridge and a relief groove behind said ridge and said hook means is formed with a shaped end portion adapted to be engaged with said ridge on said catch, said catch being further formed with recess means adapted for engagement with rubber stopper means provided on said roof panel.

7. A car body structure in accordance with claim 4 in which said holding means on said roof panel includes recess and projection means provided between said handle and said roof panel.

8. A car body structure in accordance with claim 1 which further includes back window locking means for retaining said back window panel on said car body structure in a position wherein said back window panel closes said back window opening, said back window locking means including a second catch mounted on said rear structure of said car body structure, a second handle mounted on said back window panel through a link, retaining means provided on said second handle and adapted for engagement with said second catch, means for holding said second handle in a locking position.

9. A car body structure in accordance with claim 8 in which said retaining means includes a pin, said second catch includes a hook adapted for engagement with said pin on said second handle and guide means provided adjacent to said hook for guiding said pin toward said hook when said back window panel is being moved into said position wherein said back window panel closes said back window opening.

10. A car body structure in accordance with claim 8 in which click stop means is provided between said link and said car body structure, said click stop means includes resilient spring means provided on said car body structure and a plurality of flattened edges formed on said link and adapted for alternate engagement with said spring means on said car body structure.

11. A car body structure in accordance with claim 8 in which said holding means for holding said second handle in said locking position includes recess and projection means provided between said second handle and said car body structure.

* * * * *